US00RE38096E

(19) United States
(12) Reissued Patent
Branthwaite et al.

(10) Patent Number: US RE38,096 E
(45) Date of Reissued Patent: Apr. 29, 2003

(54) ARROW REST

(75) Inventors: Wilfred Issac Branthwaite, Durham, NC (US); Stephen Charles Graf, Pittsboro, NC (US)

(73) Assignee: Carolina Archery Products, Inc., Hillsborough, NC (US)

(21) Appl. No.: 09/470,600

(22) Filed: Dec. 22, 1999

Related U.S. Patent Documents

Reissue of:
(64) Patent No.: 5,896,849
Issued: Apr. 27, 1999
Appl. No.: 09/050,171
Filed: Mar. 30, 1998

(51) Int. Cl.[7] ..... F41B 5/22
(52) U.S. Cl. ..... 124/44.5
(58) Field of Search ..... 124/24.1, 44.5

(56) References Cited

U.S. PATENT DOCUMENTS

| | | | | |
|---|---|---|---|---|
| 4,282,850 A | | 8/1981 | Warnicke | 124/24.1 |
| 4,351,311 A | | 9/1982 | Phares | 124/44.5 |
| 4,372,282 A | | 2/1983 | Sanders | 124/24 |
| 4,759,337 A | * | 7/1988 | Suski | 124/44.5 X |
| 4,858,589 A | | 8/1989 | Chang | 124/24.1 |
| 4,917,072 A | | 4/1990 | Chang | 124/44.5 |
| 5,042,450 A | | 8/1991 | Jacobson | 124/44.5 |
| 5,253,633 A | | 10/1993 | Sisko | 124/44.5 |
| 5,456,242 A | | 10/1995 | Ruholl | 124/44.5 |
| 5,460,153 A | | 10/1995 | Huntt | 124/44.5 |

* cited by examiner

*Primary Examiner*—John A. Ricci
(74) *Attorney, Agent, or Firm*—Steven Gardner; Kilpatrick Stockton LLP

(57) ABSTRACT

An improved arrow rest for use in combination with an archery bow is disclosed. The present arrow rest provides complete radial support to an arrow disposed in a ready-to-draw position even if the bow is tilted or rotated radially relative to an axis of the arrow. Such radial support is provided by an inverted coil brush comprising a disc-shaped structure having a plurality of radially disposed, inwardly projecting bristles of a predetermined length attached therein forming a central opening in the arrow rest wherein the arrow shaft is radially supported. The bristles are arranged within the coil brush so as to impart no significant hindrance to the passage of an arrow therethrough. Thus, no angular orientation of the arrow vanes to the arrow nock is required which permits the use of the arrow rest with any configuration of arrow fletching or number of vanes. In addition, the present arrow rest can be used with any diameter of arrow shaft while maintaining both vertical and horizontal position without adjusting the rest position. Further, the present arrow rest improves the stability of an arrow in flight by dampening arrow vibration in all directions as it is released from the bowstring.

43 Claims, 6 Drawing Sheets

ARROW REST

Matter enclosed in heavy brackets [ ] appears in the original patent but forms no part of this reissue specification; matter printed in italics indicates the additions made by reissue.

BACKGROUND OF INVENTION

1. Field of Invention

The present invention relates generally to archery equipment and, more particularly, to an arrow rest for guiding and supporting an arrow on an archery bow.

Arrow supporting devices or so-called arrow rests are well known to those skilled in the art. The arrow rest provides several important functions for the archer. Initially, the arrow rest supports an arrow prior to and during drawing the archery bow to a shooting position and guiding the arrow toward the target after it has been released from the bow string. In addition, the arrow rest must cause a minimal amount of frictional resistance to the arrow as it is released from the bow, and minimal damage to the arrow shaft or fletching i.e. feathers.

In addition, the arrow rest will ideally support the arrow in a drawn position when the bow is tilted or rotated radially which is often the case during hunting. In this situation the mid-section of the arrow may slip from the arrow rest invariably causing the hunter to miss the target.

Although some prior art devices as disclosed in U.S. Pat. Nos. 4,282,850, 5,460,153 and 4,372,282 provide radial support of the arrow shaft, such devices have proven to be less than satisfactory. In particular, such devices impart severe frictional resistance to the passage of the arrow unless the fletching is oriented rather precisely to the radial openings in the arrow rest.

Thus, the present invention has been developed to overcome these problems and other shortcomings of the prior art devices.

2. Description of Related Prior Art

U.S. Pat. No. 4,372,282 to Edward Sanders discloses a device for supporting an arrow disposed in a ready-to-shoot position on an archery bow. Although this arrow rest provides radial support to the mid-portion of an arrow, the arrow must be radially oriented to the arrow support to avoid damaging the arrow fetching as it passes through the arrow rest.

U.S. Pat. No. 5,042,450 to William J. Jacobson discloses a device for supporting an arrow on an archery bow including an annular body wherein three support fingers provide radial support and guidance for the arrow. However, this arrow support also requires proper angular orientation of the fetching to the opening between the finger supports to prevent damage to the fletching.

U.S. Pat. No. 5,460,153 to Robert L. Huntt discloses an archery arrow guide including an elastomeric diaphragm having a central opening for receiving an arrow shaft and a plurality of openings through which the vanes on the arrow are projected as the arrow is released from the bow. However, this arrow guide also requires proper orientation of the arrow vanes to the radial openings in the diaphragm to prevent damage to the arrow vanes.

U.S. Pat. No. 4,282,850 to Allen E. Warnicke discloses an archery bow having an arrow guide apparatus for holding and guiding a vaned arrow. The apparatus includes a channel formed in the bow's handle section and three flexible fins mounted at angularly spaced intervals within the channel and projecting radially inwardly therein. This apparatus also requires angular orientation of the arrow fetching to the openings between the flexible fins.

U.S. Pat. No. 4,858,589 to Steven Chang discloses an archery arrow sighting apparatus which is mounted to an archery bow. An arrow supporting element is formed from an elastomeric material having a generally truncated triangular configuration which must be aligned with the arrow fletching.

U.S. Pat. No. 4,917,072 also to Steven Chang discloses a combination arrow sighting and support apparatus including a conical arrow support portion having a central aperture and arrow feather slots arranged in a triangular pattern to permit passage of the feathers.

U.S. Pat. No. 5,456,242 to Eric J. Ruholl discloses an arrow rest for an archery bow having a guide plate defining a central opening, three slots extending radially from the central opening, and a plurality of set screws projecting into the central opening to provide an adjustable support structure for arrow shafts. This arrow rest includes the typical triangular configuration for passage of the arrow fletching.

SUMMARY OF THE INVENTION

After much research and study of the prior art devices, the present invention has been developed to provide an arrow rest which will provide complete radial support of an arrow in a ready-to-draw position even when the bow is tilted or rotated radially which is often desirable while hunting.

In addition, the arrow rest of the present invention does not require any angular orientation of the vanes or fletching to the arrow nock as is typically the case in the prior art devices. Because no angular orientation of the fletching is necessary, the present arrow rest can be used with virtually any style of fletching and with any number of vanes without damaging the arrow.

Further, the present arrow rest improves the stability of the arrow in flight by dampening arrow vibration in all directions thereby reducing distortion of the arrow shaft.

In view of the above, it is an object of the present invention to provide an improved arrow rest which provides complete radial support to the arrow shaft even when the bow is tilted or rotated radially.

Another object of the present invention is to provide an arrow rest which does not require any angular orientation of the fletching to the arrow nock when shooting.

Another object of the present invention is to provide an improved arrow rest which is compatible with any number of vanes or fletching.

Another object of the present invention is to provide an arrow rest which improves the stability of the arrow in flight by dampening arrow vibration at the time of release from the bow.

Another object of the present invention is to provide an arrow rest which allows for quick bow movement without loss of arrow alignment on the arrow rest.

Another object of the present invention is to provide an arrow holder which secures the arrow to the bow in a relaxed or drawn position.

Other objects and advantages of the present invention will become apparent and obvious from a study of the following description and the accompanying drawings which are merely illustrative of such invention.

DETAILED DESCRIPTION OF INVENTION

Figure 1:
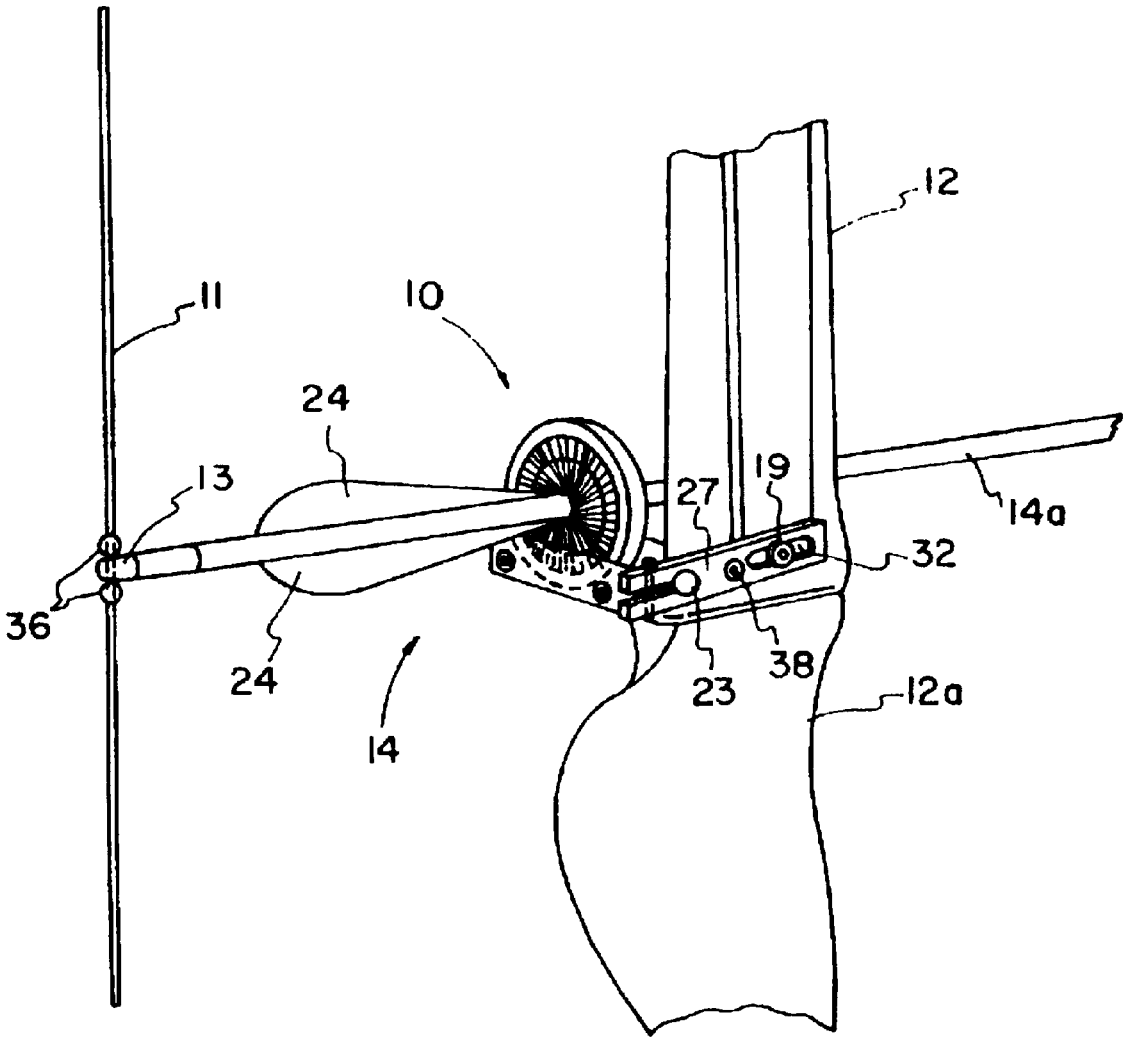
FIG. 1 is a cutaway perspective view of the arrow rest of the present invention shown installed on an archery bow.

With reference to the drawings there is shown therein an improved arrow guiding device or arrow rest in accordance with the present invention, indicated generally at 10 and illustrated in FIG. 1. The arrow rest 10 is shown installed in its functional position on an archery bow 12. An arrow 14 is shown in a ready-to-draw position on the bow 12.

By a ready-to-draw position, it is meant that the nock 13 of the arrow is received on the nocking point of the bow string 11 and the arrow 14 is inserted through the arrow rest 10 above the handle 12a of the bow. From the position shown in FIG. 1, the arrow 14 is ready to be drawn and released at a target.

Figure 2:
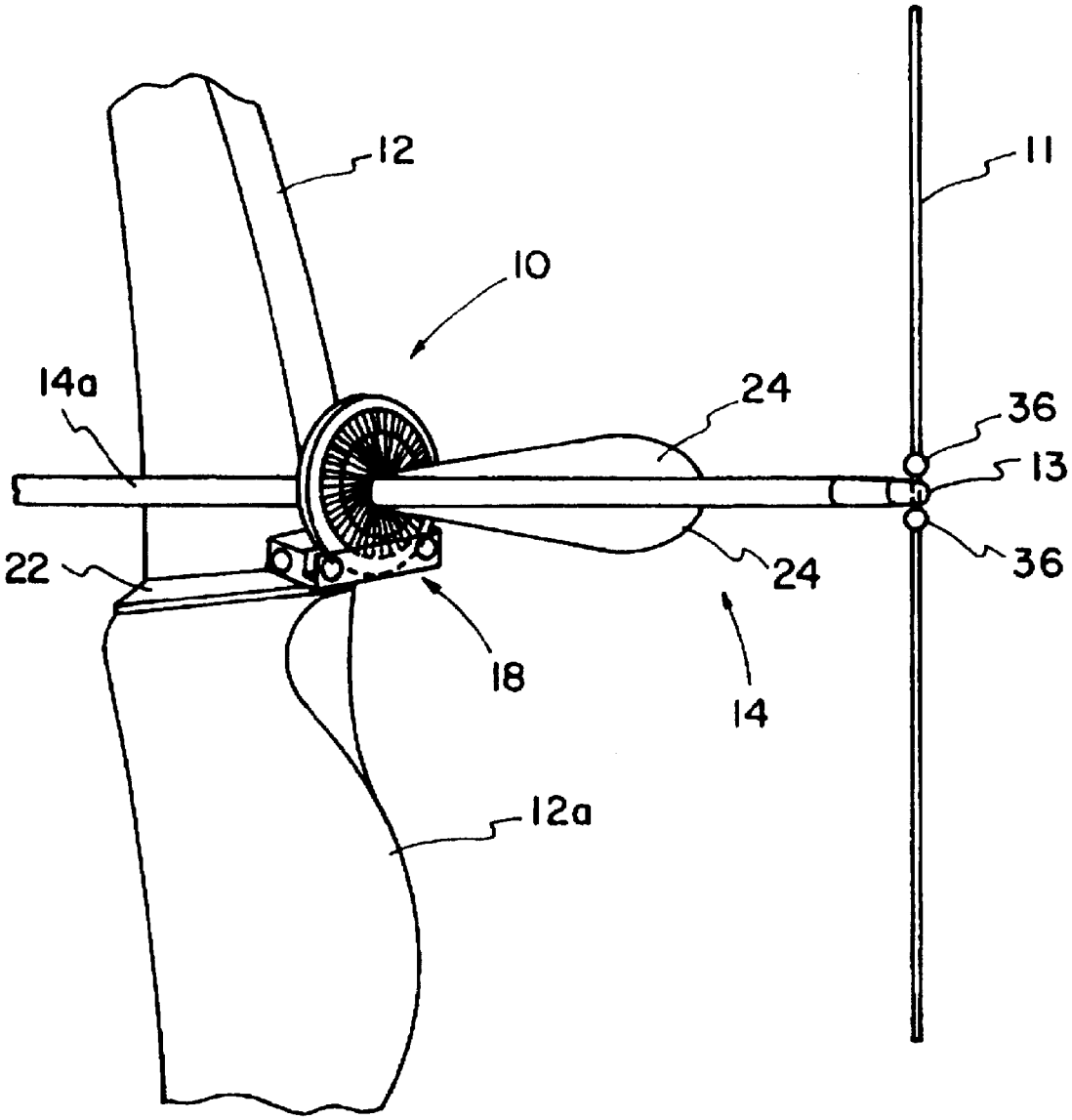
FIG. 2 is a cutaway perspective view of the arrow rest depicted in FIG. 1 as shown from the opposite side of the archery bow.

Referring now to FIG. 2, it will be appreciated that in the absence of the present arrow rest 10 the arrow 14 rests in a generally right-angled shelf 22 formed in the bow 12 just above the handle 12a. On many commercially available bows this shelf 22 includes some form of a resilient pad (often a leather strip or feathered pad) to prevent the arrow 14 from scraping against the bow 12 as it is released therefrom.

The improved arrow rest 10 of the present invention provides this function as well and offers additional advantages. Initially, the improved arrow rest 10 provides complete radial support to the arrow whenever the bow is tilted or rotated radially in any direction. This is a significant advantage to the hunter in the field whose shooting position will be dictated by an approaching game animal and the surrounding terrain. Thus, the improved arrow rest 10 allows for quick changes of position and prevents the arrow 14 from coming off the rest 10 as the result of jarring impacts.

Perhaps more importantly, the improved arrow rest 10 of the present invention does not require any angular orientation of the vanes or fletching 24 to the arrow nock 13 as is required in the prior art devices described hereinabove.

Figure 3:
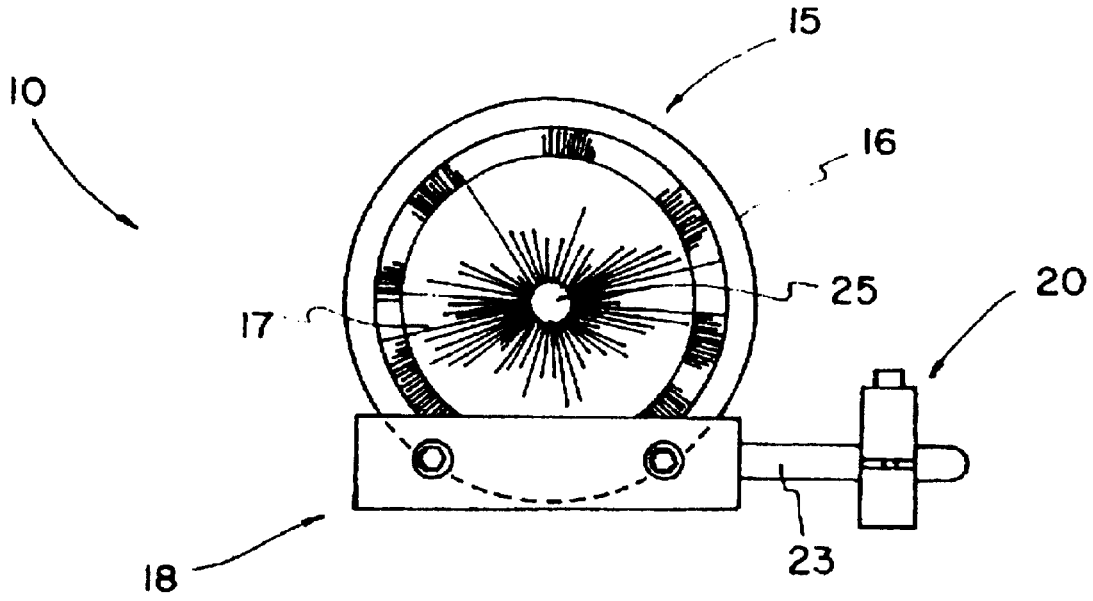
FIG. 3 is a rear elevational view of the arrow rest of the present invention as seen from a user's perspective.
Figure 4:
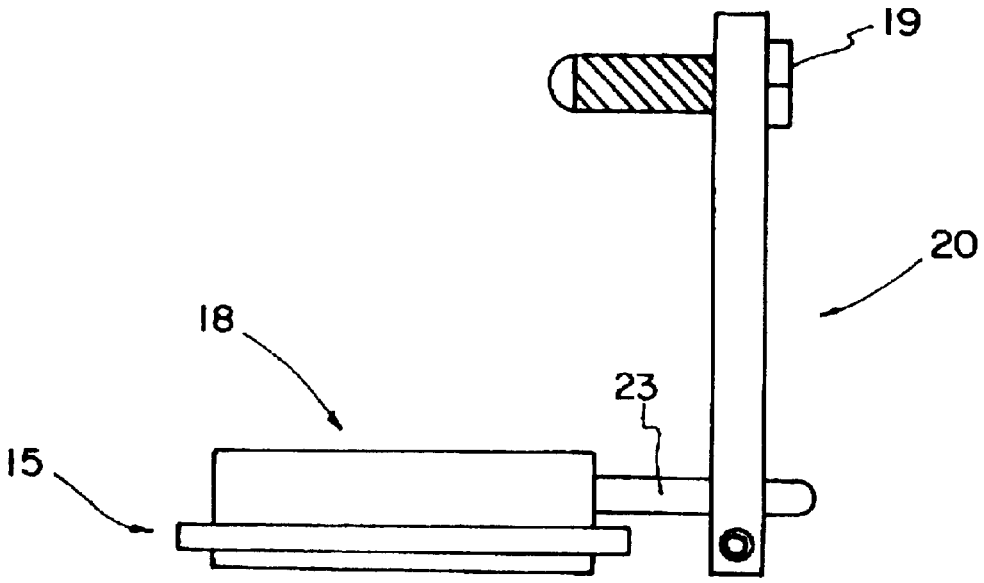
FIG. 4 is a plan view of the arrow rest of the present invention showing the mounting bracket and linkage arm assembly thereof.

Referring now to FIG. 3 the arrow rest 10 will be described in further detail. The arrow rest 10 includes a generally disk-shaped inverted coil brush, indicated generally at 15, which is installed in a mounting bracket, indicated generally at 18. The bracket 18 is mechanically coupled to a linkage arm assembly indicated generally at 20 as more clearly shown in FIG. 4, which is attached to the bow 12 by suitable attaching hardware such as machine bolt 19.

Figure 5:
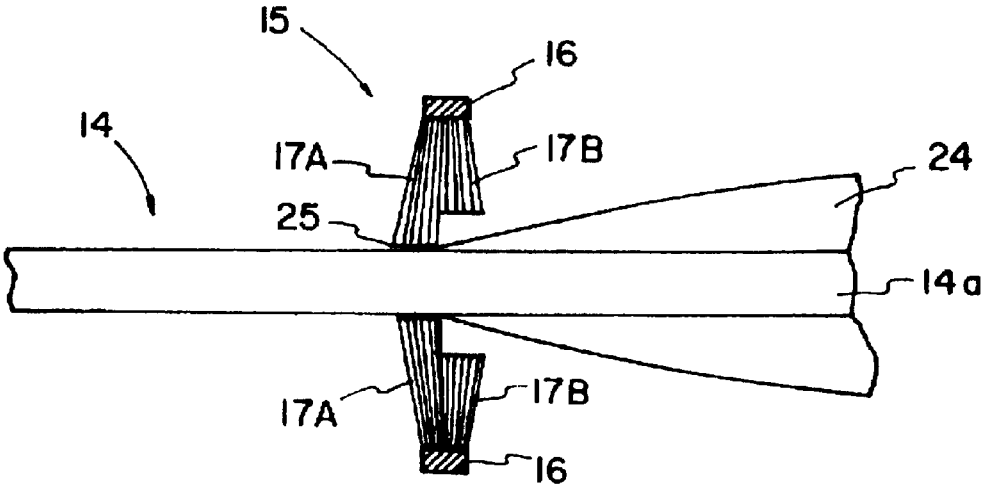
FIG. 5 is a cross-sectional view of an arrow disposed within the arrow rest in a ready-to-draw position.

The inverted coil brush 15 includes a ring portion 16 which is generally U-shaped in cross-section such that a plurality of radially disposed, inwardly projected bristles 17 may be permanently captured therein by crimping outer ends thereof in the U-shaped ring 16 as more clearly shown in FIG. 5.

In the preferred embodiment an inverted coil brush of the type manufactured by the SealEze Corporation, 8000 White Pine Road, Richmond, Va. 23237 is suitable for use with the arrow rest 10 of the present invention. Of course, other similar inverted coil brushes may be utilized with the present arrow rest in a particular embodiment.

The bristles 17 are fabricated from nylon or other suitable material of sufficient strength and resiliency to withstand repeated deflection by an arrow 14 being projected therethrough. A bristle thickness of approximately 0.016 has been demonstrated to be adequate for this application.

In the embodiment shown in FIG. 5 the coil brush 15 is made up of a layer of primary bristles 17A adjacent to a layer of secondary bristles 17B. The primary bristles 17A measure approximately ¾ of an inch in length in comparison to secondary bristle length of approximately ½ inch. In such a configuration the primary bristles 17A provide sufficient radial support to the arrow shaft while the shorter secondary layer of bristles 17B reduces the frictional resistance imparted to the arrow vanes 24 as the arrow 14 is projected through the coil brush 15.

Figure 6:
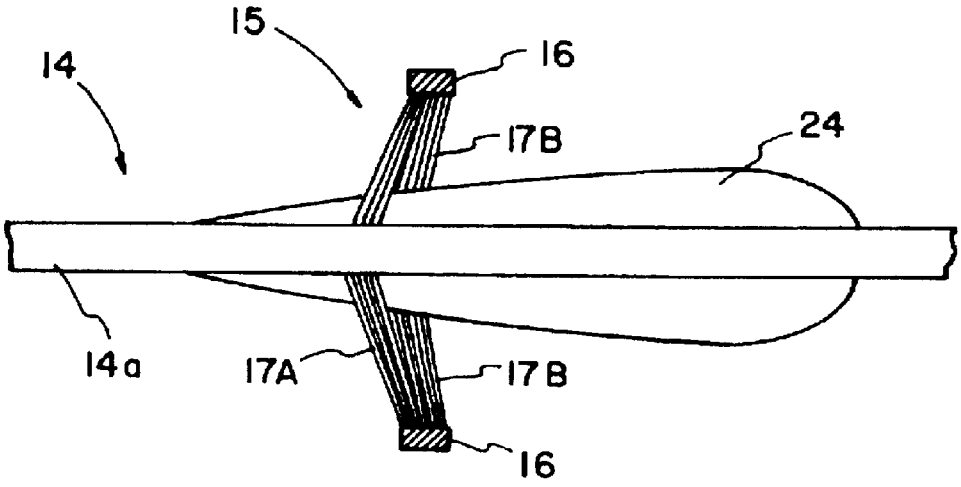
FIG. 6 is a cross-sectional view of an arrow disposed within the arrow rest as it is being projected therethrough.

When an arrow 14 is projected through the coil brush 15 the bristles 17A are deflected forwardly in the direction of arrow travel as shown in FIG. 6 and thereafter spring back to their original position defining the central opening 25.

Figure 7:
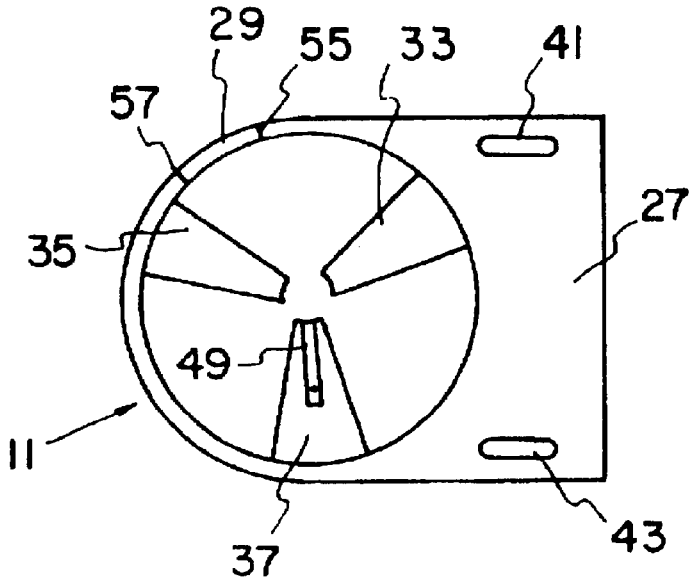
FIG. 7 PRIOR ART
FIG. 7 is a rear elevational view of an arrow support of the prior art shown from a user's perspective and labeled Prior Art.

In this aspect, the arrow rest 10 of the present invention differs substantially from the prior art devices. With reference to FIG. 7 there is shown therein an example of a prior art arrow rest for an archery bow as disclosed in U.S. Pat. No. 4,372,282 and labeled PRIOR ART. In the Prior Art example, three wedge-shaped arm members 33, 35, and 37 extend radially inwardly into the opening in the ring portion 29. The base of each of the wedge-shaped arm members is connected to the interior of the ring portion 29.

As shown in FIG. 7, the three arms 33, 35 and 37 are equally spaced at approximately 120° radial angles from each other. Thus, three equal openings are formed for the arrow vanes to pass through when the arrow is projected. Normally, when an arrow is nocked the so-called cock feather (not shown) extends outwardly at a right angle to the left of the bow string (on a right handed bow). The other two vanes are oriented 120° from the cock feather. This feather positioning is achieved each time the arrow is nocked. Therefore, by arranging the wedge-shaped arms 33, 35, and 37 such that they do not intersect the plane of the feathers when thus positioned, the feathers will pass through the openings between the arms without being damaged when the arrow is projected.

It will be appreciated by those skilled in the art that no such angular orientation of the arrow vanes 24 is required in the use of the present invention. Further, the present invention may be used with vanes or fletching such as straight, left helical, or right helical and with any number of vanes i.e. 3, 4, 5 etc. without concern for damaging or tearing the fletching as would occur with the PRIOR ART arrow rest of FIG. 7 if any type fletching other than the standard 3 vane configuration with 120° orientation between the vanes is utilized.

Figure 8:
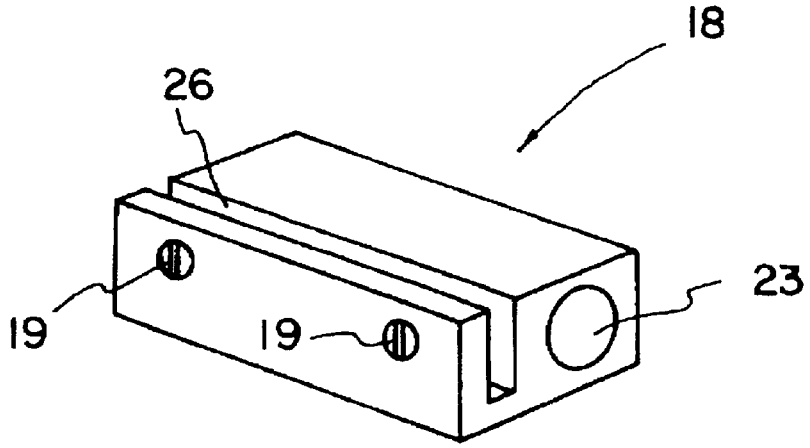
FIG. 8 is a perspective view of the mounting bracket which forms a part of the arrow rest of the present invention.
Figure 9:
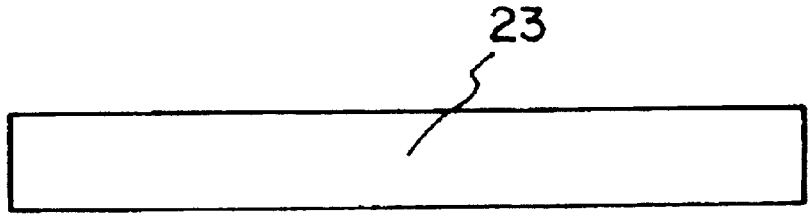
FIG. 9 is a side elevational view of the support shaft component of the present arrow rest.

To permit the improved arrow rest 10 to be mounted onto the bow 12, the coil brush 15 is installed in a longitudinal slot 26 formed in the mounting bracket 18 as shown in FIG. 8. The coil brush 15 is secured in the slot by means of a pair of set screws 19. The mounting bracket 18 includes a cylindrical aperture 23 extending the entire length thereof which is adapted to receive an elongated, cylindrical support shaft 23 as shown in FIG. 9

The support shaft 23 is dimensioned to provide a sliding fit within the aperture 23 and is secured therein by means of a set screw (not shown).

Figure 10:
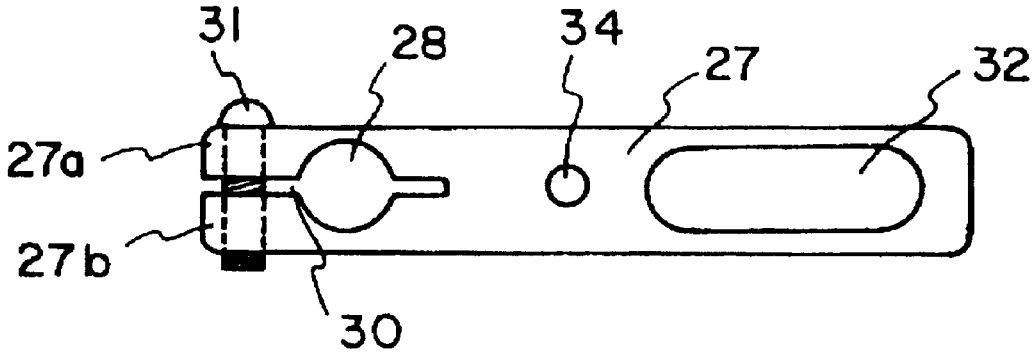
FIG. 10 is a side elevational view of the linkage arm of the present arrow rest for attachment to an archery bow.

An opposite end of the support shaft 23 is coupled to an elongated linkage arm member 27 as shown in FIG. 10. The arm member 27 includes a mounting hole 28 formed at one end thereof which is dimensioned to receive the support shaft 23 therein.

In the preferred embodiment, the mounting hole 28 communicates with a slot 30 formed along the longitudinal axis of the arm member 27 dividing the end of the arm member 27 into a pair of generally parallel fingers 27a and 27b. A machine bolt 31 engages a mating thread formed in a hole extending through both fingers 27a and 27b to provide a clamping mechanism for securing the arm member 27 to the support shaft 23 and providing an adjustment for the radial orientation of the bracket 18 to the shaft 23.

An opposite end of the arm member 27 includes an elongated slot 32 formed therein which is adapted to receive the machine bolt 19 in order to secure the arm member 27 to the bow 12. The elongated slot 32 also provides an adjustment for positioning the arrow rest 10 at a desired position in the horizontal plane.

The arm member 27 also includes a tapped hole 34 to accept a locking set screw 38 which rigidly secures the arm member 27 to the bow 12. By utilizing the locking screw 38 and the slot 32, the vertical orientation of the arrow rest 10 for shooting can be adjusted. In addition, this means of attachment allows the arrow rest 10 to be removed when it is not needed.

In practical use, after the arrow rest 10 has been attached to the bow 12 and the linkage arm assembly 20 has been adjusted to the desired position, the coil brush 15 will lie in a plane generally perpendicular to the longitudinal axis of the arrow 14 as shown in FIG. 1.

Thereafter, the tip of the arrow 14 is inserted into the central opening 25 defined by the inwardly projecting bristles 17 and the shaft 14a is urged between the ends of the bristles 17 to a point adjacent the vanes 24 as shown in FIG. 1. The nock 13 is then positioned on the nocking point of the bow string 11 and the arrow 14 is ready to be drawn and projected at a target.

The nock 13 of the arrow 14 typically includes a horizontally opposed pair or protuberances (not shown) which engage the bowstring 11 and prevent the arrow 14 from slipping off the bowstring. The bowstring 11 also includes a vertically opposed pair of beads 36 either side of the nocking point to capture the arrow 14 once it has been nocked on the bowstring.

It can be seen that with or without these features, the arrow rest 10 including the inverted coil brush 15 which provides 360° support about the arrow shaft 14a, is retained in a ready-to-draw condition even when the bow 12 is tilted or rotated radially about a longitudinal axis of the arrow as is often desirable for hunters in the field.

Further, the improved arrow rest 10 will prevent the arrow 14 from falling from the bow 12 even if the nock 13 comes off the bowstring 11 as the result of a quick bow movement or a jarring impact.

The present arrow rest 10 provides additional advantages and features not shown in the prior art devices. For example, the present arrow rest 10 has been demonstrated to improve the stability of an arrow 14 in flight by dampening arrow vibration in all directions as it passes through the inverted coil brush 15 as shown in FIG. 6.

In addition, the radially disposed bristles 17 of the inverted coil brush 15 allow the arrow 14 to be drawn and released more silently than conventional arrow rests utilizing movable brackets or pivots and springs. Thus, game animals within ear shot of the hunter are not alerted to his presence as the bow is drawn and an arrow is released.

From the above it can be seen that the present invention provides the archery enthusiast with an improved arrow rest that provides complete radial support when an arrow is held in a ready-to-draw position even when the bow is tilted or rotated radially.

The present invention also provides an arrow rest which does not require any orientation of fletching to nock alignment and, thus, effectively provides a universal fit with all types of arrow fletching such as straight, left helical, right helical and with any number of vanes i.e. 3, 4, or 5 vanes.

In addition, the present arrow rest imparts stability to the arrow in flight by dampening arrow vibration in all directions at the time of release from the bow.

Further, the present arrow rest allows an arrow to be drawn and released more silently than conventional arrow rests utilizing movable brackets or pivots and springs, which tend to alert game animals to the presence of the bow hunter.

The terms "inner", "outer", "side", and so forth have been used herein merely for convenience to describe the present invention and its parts as oriented in the drawings. It is to be understood, however, that these terms are in no way limiting to the invention since such invention may obviously be disposed in different orientations when in use.

The present invention may, or course, be carried out in other specific ways than those herein set forth without departing from the spirit and essential characteristics of such invention. The present embodiments are, therefore, to be considered in all respects as illustrative and not restrictive, and all changes coming within the meaning and equivalency range of the appended claims are intended to be embraced therein.

What is claimed is:

1. An arrow rest for use with an archery bow of the type including a curved bow member having opposite ends, said bow member having a bow string extending between said opposite ends and being attached thereto under tension to permit an arrow having vanes to be projected therefrom, said arrow rest comprising:

means for radially supporting said arrow in a ready-to-draw position relative to said bow member, said supporting means including a generally disc-shaped, inverted coil brush having a plurality of bristles extending radially inwardly and defining a central opening wherein said arrow is radially supported in said ready-to-draw position; and means for removably attaching said radially supporting means to said bow member such that said bow is functional in a conventional manner with said arrow rest removed.

2. The arrow rest of claim 1 wherein said bristles are disposed within said coil brush such that said arrow may be projected therethrough without regard to the angular orientation of said vanes to said arrow rest.

3. The arrow rest of claim 2 wherein said bristles within said coil brush are of the same length.

4. The arrow rest of claim 2 wherein said bristles are radially disposed within said coil brush in a plurality of layers, said bristles within each respective layer being of different lengths thereby defining a central opening within each layer having a different diameter whereby the frictional resistance imparted to said arrow passing through said coil brush is reduced.

5. The arrow rest of claim 2 wherein said coil brush is capable of increased diameter deflection thereby changing the diameter of said central opening to accommodate arrows of various diameters whereby the frictional resistance imparted to said arrow passing through said coil brush is reduced.

6. The arrow rest of claim 1 wherein said arrow rest is usable with an arrow having any number of said vanes and any angular orientation of said vanes.

7. The arrow rest of claim 1 wherein said attaching means includes a mounting bracket adapted to position said coil brush in a plane generally perpendicular to that plane defined by said bow and said bow string.

8. The arrow rest of claim 7 wherein said attaching means includes a linkage arm assembly that is mechanically coupled to said mounting bracket such that said coil brush is adjustable in a plane perpendicular to a longitudinal axis of said arrow enabling the inclination of said arrow relative to said bow to be adjusted.

9. The arrow rest of claim 1 wherein said attaching [said] *means* can be installed on said bow without permanent modification thereof.

*10. An arrow rest for use with an archery bow of the type including a curved bow member having opposite ends, said bow member having a bow string extending between said opposite ends and being attached thereto under tension to permit an arrow having vanes to be projected therefrom, said arrow rest comprising:*

*means for radially supporting said arrow in a ready-to-draw position relative to said bow member, said supporting means including an inverted brush having a plurality of bristles extending radially inwardly into a flight path of said vanes and defining an opening wherein said arrow is radially supported in said ready-to-draw position.*

*11. The arrow rest of claim 10 wherein said bristles are disposed within said inverted brush such that said arrow may be projected therethrough without regard to the angular orientation of said vanes to said arrow rest.*

*12. The arrow rest of claim 11 wherein said bristles within said inverted brush are of the same length.*

*13. The arrow rest of claim 11 wherein said bristles are radially disposed within said inverted brush in a plurality of layers, said bristles within each respective layer being of different lengths thereby defining a central opening within each layer having a different diameter whereby the frictional resistance imparted to said arrow passing through said inverted brush is reduced.*

*14. The arrow rest of claim 11 wherein said inverted brush is capable of increased diameter deflection thereby changing the diameter of said central opening to accommodate arrows of various diameters whereby the frictional resistance imparted to said arrow passing through said inverted brush is reduced.*

*15. The arrow rest of claim 10 wherein said arrow rest is usable with an arrow having any number of said vanes and any angular orientation of said vanes.*

*16. The arrow rest of claim 10, wherein said arrow rest further comprises a means for removably attaching said radially supporting means to said bow member such that said bow is functional in a conventional manner with said arrow rest removed.*

*17. The arrow rest of claim 16 wherein said attaching means includes a mounting bracket adapted to position said inverted brush in a plane generally perpendicular to that plane defined by said bow and said bow string.*

*18. The arrow rest of claim 17 wherein said attaching means includes a linkage arm assembly that is mechanically coupled to said mounting bracket such that said inverted brush is adjustable in a plane perpendicular to a longitudinal axis of said arrow enabling the inclination of said arrow relative to said bow to be adjusted.*

*19. The arrow rest of claim 16 wherein said attaching means can be installed on said bow without permanent modification thereof.*

*20. An arrow rest comprising a support for holding an arrow having fletching in a ready-to-draw position relative to a bow member, said support comprising a plurality of bristles extending radially inwardly into a flight path of said fletching and defining an opening wherein said arrow is radially supported in said ready-to-draw position.*

*21. The arrow rest of claim 20, wherein said arrow rest further comprises a mounting bracket adapted to position said support in a plane generally perpendicular to that plane defined by said bow member and a bow string.*

*22. The arrow rest of claim 21 wherein said mounting bracket further comprises a linkage arm assembly that is mechanically coupled to said mounting bracket such that said support is adjustable in a plane perpendicular to a longitudinal axis of said arrow enabling the inclination of said arrow relative to said bow member to be adjusted.*

*23. The arrow rest of claim 22 wherein said mounting bracket can be installed on said bow member without permanent modification thereof.*

*24. An arrow rest comprising a support for holding an arrow having fletching in a ready-to-draw position relative to a bow member, said support comprising a plurality of extending projections in a flight path of said fletching and defining an opening wherein said arrow is radially supported in said ready-to-draw position.*

*25. The arrow rest of claim 24 wherein said extending projections comprise bristles.*

*26. The arrow rest of claim 24 wherein said opening comprises a circular opening defined by the extending projections.*

*27. The arrow rest of claim 24 wherein said extending projections extend radially inwardly.*

*28. The arrow rest of claim 27 wherein said extending projections contact said arrow.*

*29. The arrow rest of claim 24 wherein said extending projections extend towards a single point.*

*30. The arrow rest of claim 29 wherein said single point is within said opening.*

*31. The arrow rest of claim 24 wherein said arrow is radially supported by the extending projections for 360 degrees about the longitudinal axis of said arrow.*

*32. The arrow rest of claim 24 wherein said extending projections hold the arrow such that the arrow remains within the opening upon perpendicular force relative to the longitudinal axis of said arrow.*

*33. An arrow rest comprising a support for holding an arrow having fletching in a ready-to-draw position relative to a bow member, said support comprising a plurality of extending projections in a flight path of said fletching, wherein said arrow is radially supported by the extending projections for 360 degrees about the longitudinal axis of said arrow when said arrow is in said ready-to-draw position.*

*34. The arrow rest of claim 33 wherein said extending projections hold the arrow such that said arrow is radially supported by the extending projections for 360 degrees upon perpendicular force relative to the longitudinal axis of said arrow.*

*35. An arrow rest comprising a support for holding an arrow having fletching in a ready-to-draw position relative to a bow member, said support comprising a plurality of extending projections in a flight path of said fletching, wherein said arrow is radially supported in said ready-to-draw position, and wherein said extending projections hold the arrow such that the arrow remains within the opening upon perpendicular force relative to the longitudinal axis of said arrow.*

*36. The arrow rest of claim 35 wherein said arrow is radially supported by the extending projections for 360 degrees about the longitudinal axis of said arrow.*

*37. An arrow rest for use with an archery bow of the type including a curved bow member having opposite ends, said bow member having a bow string extending between said opposite ends and being attached thereto under tension to permit an arrow having vanes to be projected therefrom, said arrow rest comprising:*

*means for radially supporting said arrow in a ready-to-draw position relative to said bow member, said supporting means including an inverted brush having a plurality of bristles extending radially inwardly and defining an opening wherein said arrow is radially supported in said ready-to-draw position, wherein said bristles are disposed within said inverted brush such that said arrow may be projected therethrough without regard to the angular orientation of said vanes to said arrow rest.*

*38. The arrow rest of claim 37 wherein said bristles within said inverted brush are of the same length.*

*39. The arrow rest of claim 37 wherein said bristles are radially disposed within said inverted brush in a plurality of layers, said bristles within each respective layer being of different lengths thereby defining a central opening within each layer having a different diameter whereby the frictional resistance imparted to said arrow passing through said inverted brush is reduced.*

*40. The arrow rest of claim 27 wherein said inverted brush is capable of increased diameter deflection thereby changing the diameter of said central opening to accommodate arrows of various diameters whereby the frictional resistance imparted to said arrow passing through said inverted brush is reduced.*

*41. An arrow rest for use with an archery bow of the type including a curved bow member having opposite ends, said bow member having a bow string extending between said opposite ends and being attached thereto under tension to permit an arrow having vanes to be projected therefrom, said arrow rest comprising:*

*means for radially supporting said arrow in a ready-to-draw position relative to said bow member, said supporting means including an inverted brush having a plurality of bristles extending radially inwardly and defining an opening wherein said arrow is radially supported in said ready-to-draw position, wherein said arrow rest further comprises a means for removably attaching said radially supporting means to said bow member such that said bow is functional in a conventional manner with said arrow rest removed, said attaching means includes a mounting bracket adapted to position said inverted brush in a plane generally perpendicular to that plane defined by said bow and said box string, and said attaching means includes a linkage arm assembly that is mechanically coupled to said mounting bracket such that said inverted brush is adjustable in a plane perpendicular to a longitudinal axis of said arrow enabling the inclination of said arrow relative to said bow to be adjusted.*

*42. An arrow rest comprising a support for holding an arrow in a ready-to-draw position relative to a bow member, said support comprising a plurality of bristles extending radially inwardly and defining an opening wherein said arrow is radially supported in said ready-to-draw position, wherein said arrow rest further comprises a mounting bracket adapted to position said support in a plane generally perpendicular to that plane defined by said bow member and a bow string, and wherein said mounting bracket further comprises a linkage arm assembly that is mechanically coupled to said mounting bracket such that said support is adjustable in a plane perpendicular to a longitudinal axis of said arrow enabling the inclination of said arrow relative to said bow member to be adjusted.*

*43. The arrow rest of claim 42 wherein said mounting bracket can be installed on said bow member without permanent modification thereof.*

* * * * *